(12) United States Patent
McSweeney

(10) Patent No.: US 8,539,786 B2
(45) Date of Patent: Sep. 24, 2013

(54) SYSTEM AND METHOD FOR MONITORING OVERHEAT OF A COMPRESSOR

(75) Inventor: Daniel L. McSweeney, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 341 days.

(21) Appl. No.: 12/247,033

(22) Filed: Oct. 7, 2008

(65) Prior Publication Data

US 2009/0090117 A1 Apr. 9, 2009

Related U.S. Application Data

(60) Provisional application No. 60/978,312, filed on Oct. 8, 2007, provisional application No. 60/978,258, filed on Oct. 8, 2007.

(51) Int. Cl.
*F25B 49/02* (2006.01)

(52) U.S. Cl.
USPC .............. 62/228.1; 62/204; 62/225; 417/32; 417/44.1

(58) Field of Classification Search
USPC ................. 62/204, 228.1, 225; 417/32, 44.1
See application file for complete search history.

(56) References Cited

U.S. PATENT DOCUMENTS

| | | | |
|---|---|---|---|
| 2,883,255 | A | 4/1959 | Anderson |
| 2,981,076 | A * | 4/1961 | Gaugler et al. .............. 62/208 |
| 3,082,609 | A | 3/1963 | Ryan et al. |
| 3,242,321 | A | 3/1966 | Chope |
| 3,600,657 | A | 8/1971 | Pfaff et al. |
| 4,130,997 | A | 12/1978 | Hara et al. |
| 4,280,910 | A | 7/1981 | Baumann |
| 4,370,564 | A | 1/1983 | Matsushita |
| 4,460,861 | A | 7/1984 | Rosa |
| 4,461,153 | A | 7/1984 | Lindner et al. |
| 4,527,399 | A * | 7/1985 | Lord .............................. 62/212 |
| 4,653,280 | A | 3/1987 | Hansen et al. |
| 4,750,338 | A | 6/1988 | Hingst |
| 4,940,929 | A | 7/1990 | Williams |
| 5,056,712 | A | 10/1991 | Enck |
| 5,182,918 | A | 2/1993 | Manz et al. |
| 5,258,901 | A | 11/1993 | Fraidlin |

(Continued)

FOREIGN PATENT DOCUMENTS

| | | |
|---|---|---|
| CN | 1697954 A | 11/2005 |
| CN | 1806478 A | 7/2006 |

(Continued)

OTHER PUBLICATIONS

JP 2000-297970 (English Abstract).*

(Continued)

*Primary Examiner* — Marc Norman
*Assistant Examiner* — Jonathan Bradford
(74) *Attorney, Agent, or Firm* — Harness, Dickey & Pierce, P.L.C.

(57) ABSTRACT

A system and method for monitoring an overheat condition of a compressor is provided. A compressor connected to an evaporator. A suction sensor outputs a suction signal corresponding to a temperature of refrigerant entering the compressor. A control module is connected to the evaporator sensor and the suction sensor and determines an evaporator temperature, calculates a suction superheat temperature based on the evaporator temperature and the suction signal, and monitors an overheat condition of the compressor by comparing the suction superheat with a predetermined suction superheat threshold.

15 Claims, 6 Drawing Sheets

(56) References Cited

U.S. PATENT DOCUMENTS

Figure 1:
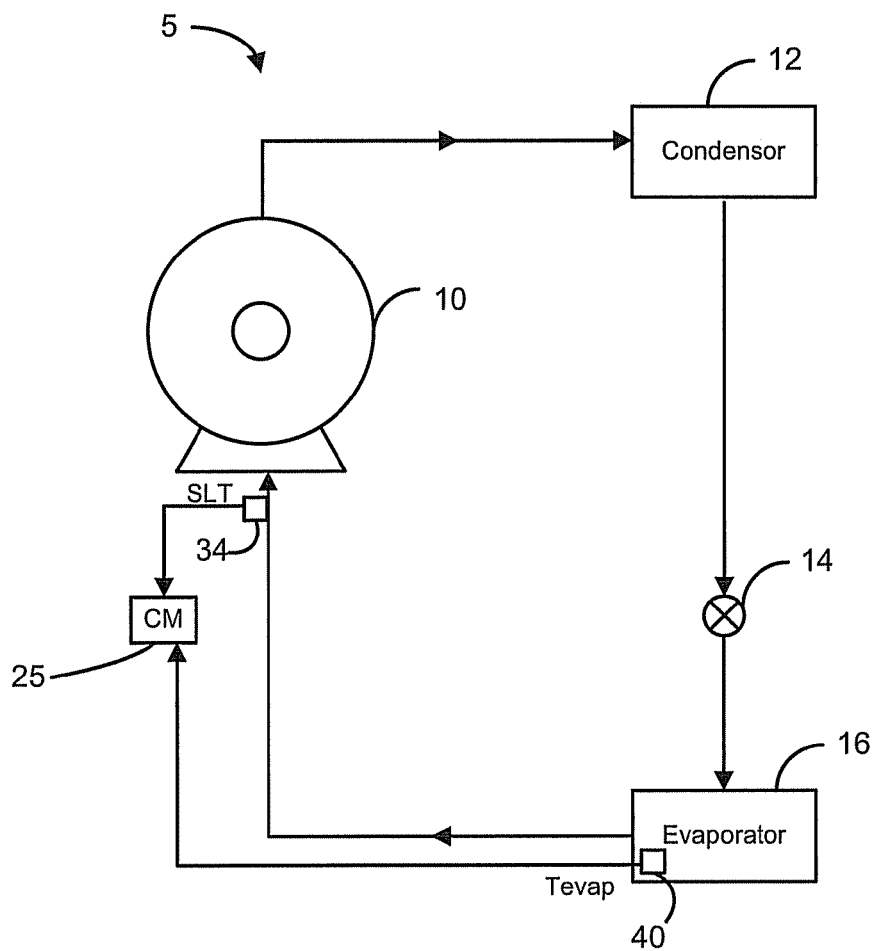

| | | |
|---|---|---|
| 5,269,146 A | 12/1993 | Kerner |
| 5,291,115 A | 3/1994 | Ehsani |
| 5,315,214 A | 5/1994 | Lesea |
| 5,347,467 A | 9/1994 | Staroselsky et al. |
| 5,359,276 A | 10/1994 | Mammano |
| 5,359,281 A | 10/1994 | Barrow et al. |
| 5,410,221 A | 4/1995 | Mattas et al. |
| 5,410,235 A | 4/1995 | Ehsani |
| 5,440,218 A | 8/1995 | Oldenkamp |
| 5,502,970 A | 4/1996 | Rajendran |
| 5,519,300 A | 5/1996 | Leon et al. |
| 5,603,222 A | 2/1997 | Dube |
| 5,603,227 A | 2/1997 | Holden et al. |
| 5,646,499 A | 7/1997 | Doyama et al. |
| 5,663,627 A | 9/1997 | Ogawa |
| 5,712,551 A | 1/1998 | Lee |
| 5,712,802 A | 1/1998 | Kumar et al. |
| 5,742,103 A | 4/1998 | Ashok |
| 5,786,992 A | 7/1998 | Vinciarelli et al. |
| 5,903,138 A | 5/1999 | Hwang et al. |
| 5,960,207 A | 9/1999 | Brown |
| 5,963,442 A | 10/1999 | Yoshida et al. |
| 6,005,365 A | 12/1999 | Kaneko et al. |
| 6,028,406 A | 2/2000 | Birk |
| 6,035,653 A | 3/2000 | Itoh et al. |
| 6,041,609 A | 3/2000 | Hornsleth et al. |
| 6,065,298 A | 5/2000 | Fujimoto |
| 6,073,457 A | 6/2000 | Kampf et al. |
| 6,091,215 A | 7/2000 | Lovett et al. |
| 6,091,233 A | 7/2000 | Hwang et al. |
| 6,102,665 A | 8/2000 | Centers et al. |
| 6,116,040 A | 9/2000 | Stark |
| 6,222,746 B1 | 4/2001 | Kim |
| 6,226,998 B1 | 5/2001 | Reason et al. |
| 6,236,183 B1 | 5/2001 | Schroeder |
| 6,236,193 B1 | 5/2001 | Paul |
| 6,259,614 B1 | 7/2001 | Ribarich et al. |
| 6,281,656 B1 | 8/2001 | Masaki et al. |
| 6,281,658 B1 | 8/2001 | Han et al. |
| 6,316,918 B1 | 11/2001 | Underwood et al. |
| 6,326,750 B1 | 12/2001 | Marcinkiewicz |
| 6,344,725 B2 | 2/2002 | Kaitani et al. |
| 6,370,888 B1 | 4/2002 | Grabon |
| 6,373,200 B1 | 4/2002 | Nerone et al. |
| 6,396,229 B1 | 5/2002 | Sakamoto et al. |
| 6,404,154 B2 | 6/2002 | Marcinkiewicz et al. |
| 6,406,265 B1 | 6/2002 | Hahn et al. |
| 6,414,462 B2 | 7/2002 | Chong |
| 6,424,107 B1 | 7/2002 | Lu |
| 6,446,618 B1 | 9/2002 | Hill |
| 6,462,492 B1 | 10/2002 | Sakamoto et al. |
| 6,471,486 B1 | 10/2002 | Centers et al. |
| 6,523,361 B2 | 2/2003 | Higashiyama |
| 6,532,754 B2 | 3/2003 | Haley et al. |
| 6,539,734 B1 | 4/2003 | Weyna |
| 6,583,593 B2 | 6/2003 | Iijima et al. |
| 6,636,011 B2 | 10/2003 | Sadasivam et al. |
| 6,657,877 B2 | 12/2003 | Kashima et al. |
| 6,670,784 B2 | 12/2003 | Odachi et al. |
| 6,688,124 B1 | 2/2004 | Stark et al. |
| 6,698,217 B2 | 3/2004 | Tanimoto et al. |
| 6,708,507 B1 | 3/2004 | Sem et al. |
| 6,714,425 B2 | 3/2004 | Yamada et al. |
| 6,735,284 B2 | 5/2004 | Cheong et al. |
| 6,749,404 B2 | 6/2004 | Gennami et al. |
| 6,753,670 B2 | 6/2004 | Kadah |
| 6,756,753 B1 | 6/2004 | Marcinkiewicz |
| 6,756,757 B2 | 6/2004 | Marcinkiewicz et al. |
| 6,758,050 B2 | 7/2004 | Jayanth et al. |
| 6,767,851 B1 | 7/2004 | Rokman et al. |
| 6,788,024 B2 | 9/2004 | Kaneko et al. |
| 6,815,925 B2 | 11/2004 | Chen et al. |
| 6,825,637 B2 | 11/2004 | Kinpara et al. |
| 6,828,751 B2 | 12/2004 | Sadasivam et al. |
| 6,831,439 B2 | 12/2004 | Won et al. |
| 6,876,171 B2 | 4/2005 | Lee |
| 6,915,646 B2 | 7/2005 | Kadle et al. |
| 6,955,039 B2 | 10/2005 | Nomura et al. |
| 6,966,759 B2 | 11/2005 | Hahn et al. |
| 6,967,851 B2 | 11/2005 | Yang et al. |
| 6,982,533 B2 | 1/2006 | Seibel et al. |
| 6,984,948 B2 | 1/2006 | Nakata et al. |
| 7,005,829 B2 | 2/2006 | Schnetzka |
| 7,049,774 B2 | 5/2006 | Chin et al. |
| 7,095,208 B2 | 8/2006 | Kawaji et al. |
| 7,138,777 B2 | 11/2006 | Won et al. |
| 7,154,237 B2 | 12/2006 | Welchko et al. |
| 7,176,644 B2 | 2/2007 | Ueda et al. |
| 7,184,902 B2 | 2/2007 | El-Ibiary |
| 7,208,895 B2 | 4/2007 | Marcinkiewicz et al. |
| 7,234,305 B2 | 6/2007 | Nomura et al. |
| 7,272,018 B2 | 9/2007 | Yamada et al. |
| 7,307,401 B2 | 12/2007 | Gataric et al. |
| 7,342,379 B2 | 3/2008 | Marcinkiewicz et al. |
| 7,375,485 B2 | 5/2008 | Shahi et al. |
| 7,458,223 B2 | 12/2008 | Pham |
| 7,554,271 B2 | 6/2009 | Thiery et al. |
| 7,580,272 B2 | 8/2009 | Taguchi et al. |
| 7,595,613 B2 | 9/2009 | Thompson et al. |
| 7,605,570 B2 | 10/2009 | Liu et al. |
| 7,613,018 B2 | 11/2009 | Lim et al. |
| 7,660,139 B2 | 2/2010 | Garabandic |
| 7,667,986 B2 | 2/2010 | Artusi et al. |
| 7,675,759 B2 | 3/2010 | Artusi et al. |
| 7,683,568 B2 | 3/2010 | Pande et al. |
| 7,688,608 B2 | 3/2010 | Oettinger et al. |
| 7,723,964 B2 | 5/2010 | Taguchi |
| 7,733,678 B1 | 6/2010 | Notohamiprodjo et al. |
| 7,738,228 B2 | 6/2010 | Taylor |
| 7,782,033 B2 | 8/2010 | Turchi et al. |
| 7,821,237 B2 | 10/2010 | Melanson |
| 7,895,003 B2 | 2/2011 | Caillat |
| 2001/0022939 A1 | 9/2001 | Morita et al. |
| 2002/0047635 A1 | 4/2002 | Ribarich et al. |
| 2002/0062656 A1 | 5/2002 | Suitou et al. |
| 2002/0108384 A1 | 8/2002 | Higashiyama |
| 2002/0117989 A1 | 8/2002 | Kawabata et al. |
| 2002/0157408 A1 | 10/2002 | Egawa et al. |
| 2002/0162339 A1 | 11/2002 | Harrison et al. |
| 2003/0019221 A1 | 1/2003 | Rossi et al. |
| 2003/0077179 A1 | 4/2003 | Collins et al. |
| 2003/0085621 A1 | 5/2003 | Potega |
| 2003/0094004 A1 | 5/2003 | Pham et al. |
| 2003/0146290 A1 | 8/2003 | Wang et al. |
| 2003/0182956 A1 | 10/2003 | Kurita et al. |
| 2004/0011020 A1 | 1/2004 | Nomura et al. |
| 2004/0061472 A1 | 4/2004 | Won et al. |
| 2004/0070364 A1 | 4/2004 | Cheong et al. |
| 2004/0085785 A1 | 5/2004 | Taimela |
| 2004/0100221 A1 | 5/2004 | Fu |
| 2004/0119434 A1 | 6/2004 | Dadd |
| 2004/0183491 A1 | 9/2004 | Sidey |
| 2004/0221594 A1 | 11/2004 | Suzuki et al. |
| 2004/0261448 A1 | 12/2004 | Nishijima et al. |
| 2005/0047179 A1 | 3/2005 | Lesea |
| 2005/0204760 A1 | 9/2005 | Kurita et al. |
| 2005/0235660 A1 | 10/2005 | Pham |
| 2005/0235661 A1 | 10/2005 | Pham |
| 2005/0235662 A1* | 10/2005 | Pham ............................. 62/126 |
| 2005/0235663 A1 | 10/2005 | Pham |
| 2005/0247073 A1 | 11/2005 | Hikawa et al. |
| 2005/0262849 A1 | 12/2005 | Nomura et al. |
| 2005/0270814 A1 | 12/2005 | Oh |
| 2006/0041335 A9 | 2/2006 | Rossi et al. |
| 2006/0042276 A1 | 3/2006 | Doll et al. |
| 2006/0048530 A1 | 3/2006 | Jun et al. |
| 2006/0056210 A1 | 3/2006 | Yamada et al. |
| 2006/0090490 A1* | 5/2006 | Grimm et al. ................. 62/181 |
| 2006/0117773 A1 | 6/2006 | Street et al. |
| 2006/0123809 A1 | 6/2006 | Ha et al. |
| 2006/0130501 A1 | 6/2006 | Singh et al. |
| 2006/0130504 A1 | 6/2006 | Agrawal et al. |
| 2006/0150651 A1 | 7/2006 | Goto et al. |
| 2006/0158912 A1 | 7/2006 | Wu et al. |

| | | |
|---|---|---|
| 2006/0185373 A1 | 8/2006 | Butler et al. |
| 2006/0187693 A1 | 8/2006 | Tang |
| 2006/0198172 A1 | 9/2006 | Wood |
| 2006/0198744 A1 | 9/2006 | Lifson et al. |
| 2006/0247895 A1 | 11/2006 | Jayanth |
| 2006/0255772 A1 | 11/2006 | Chen |
| 2006/0261830 A1 | 11/2006 | Taylor |
| 2006/0290302 A1 | 12/2006 | Marcinkiewicz et al. |
| 2007/0012052 A1 | 1/2007 | Butler et al. |
| 2007/0029987 A1 | 2/2007 | Li |
| 2007/0040524 A1 | 2/2007 | Sarlioglu et al. |
| 2007/0040534 A1 | 2/2007 | Ghosh et al. |
| 2007/0089424 A1 | 4/2007 | Venkataramani et al. |
| 2007/0118307 A1 | 5/2007 | El-Ibiary |
| 2007/0118308 A1 | 5/2007 | El-Ibiary |
| 2007/0132437 A1 | 6/2007 | Scollo et al. |
| 2007/0144354 A1 | 6/2007 | Muller et al. |
| 2008/0089792 A1 | 4/2008 | Bae et al. |
| 2008/0112823 A1 | 5/2008 | Yoshida et al. |
| 2008/0143289 A1 | 6/2008 | Marcinkiewicz et al. |
| 2008/0160840 A1 | 7/2008 | Bax et al. |
| 2008/0209925 A1 | 9/2008 | Pham |
| 2008/0216494 A1 | 9/2008 | Pham et al. |
| 2008/0232065 A1 | 9/2008 | Lang et al. |
| 2008/0252269 A1 | 10/2008 | Feldtkeller et al. |
| 2008/0265847 A1 | 10/2008 | Woo et al. |
| 2008/0272745 A1 | 11/2008 | Melanson |
| 2008/0272747 A1 | 11/2008 | Melanson |
| 2008/0273356 A1 | 11/2008 | Melanson |
| 2008/0278101 A1 | 11/2008 | Shahi et al. |
| 2008/0284399 A1 | 11/2008 | Oettinger et al. |
| 2008/0285318 A1 | 11/2008 | Tan et al. |
| 2009/0015214 A1 | 1/2009 | Chen |
| 2009/0015225 A1 | 1/2009 | Turchi et al. |
| 2009/0016087 A1 | 1/2009 | Shimizu |
| 2009/0026999 A1 | 1/2009 | Atarashi |
| 2009/0033296 A1 | 2/2009 | Hammerstrom |
| 2009/0039852 A1 | 2/2009 | Fishelov et al. |
| 2009/0059625 A1 | 3/2009 | Viitanen et al. |
| 2009/0071175 A1 | 3/2009 | Pham |
| 2009/0091961 A1 | 4/2009 | Hsia et al. |
| 2009/0094997 A1 | 4/2009 | McSweeney |
| 2009/0140680 A1 | 6/2009 | Park |
| 2009/0237963 A1 | 9/2009 | Prasad et al. |
| 2009/0243561 A1 | 10/2009 | Tan et al. |
| 2009/0273330 A1 | 11/2009 | Sisson |
| 2009/0290395 A1 | 11/2009 | Osaka |
| 2009/0295347 A1 | 12/2009 | Popescu et al. |
| 2009/0303765 A1 | 12/2009 | Shimizu et al. |
| 2009/0316454 A1 | 12/2009 | Colbeck et al. |
| 2010/0007317 A1 | 1/2010 | Yang |
| 2010/0014326 A1 | 1/2010 | Gu et al. |
| 2010/0014329 A1 | 1/2010 | Zhang et al. |
| 2010/0052601 A1 | 3/2010 | Pummer |
| 2010/0052641 A1 | 3/2010 | Popescu et al. |
| 2010/0066283 A1 | 3/2010 | Kitanaka |
| 2010/0079125 A1 | 4/2010 | Melanson et al. |
| 2010/0080026 A1 | 4/2010 | Zhang |
| 2010/0109615 A1 | 5/2010 | Hwang et al. |
| 2010/0109626 A1 | 5/2010 | Chen |
| 2010/0118571 A1 | 5/2010 | Saint-Pierre |
| 2010/0118576 A1 | 5/2010 | Osaka |
| 2010/0128503 A1 | 5/2010 | Liu et al. |
| 2010/0156377 A1 | 6/2010 | Siegler |
| 2010/0165683 A1 | 7/2010 | Sugawara |
| 2010/0181930 A1 | 7/2010 | Hopwood et al. |
| 2010/0187914 A1 | 7/2010 | Rada et al. |
| 2010/0202169 A1 | 8/2010 | Gaboury et al. |
| 2010/0226149 A1 | 9/2010 | Masumoto |
| 2010/0246220 A1 | 9/2010 | Irving et al. |
| 2010/0246226 A1 | 9/2010 | Ku et al. |
| 2010/0253307 A1 | 10/2010 | Chen et al. |
| 2010/0259230 A1 | 10/2010 | Boothroyd |
| 2010/0270984 A1 | 10/2010 | Park et al. |
| 2010/0301787 A1 | 12/2010 | Gallegos-Lopez et al. |
| 2010/0301788 A1 | 12/2010 | Chen et al. |
| 2011/0138826 A1 | 6/2011 | Lifson et al. |

FOREIGN PATENT DOCUMENTS

| | | |
|---|---|---|
| CN | 1987258 A | 6/2007 |
| JP | 55155134 A | 12/1980 |
| JP | 61272483 A | 12/1986 |
| JP | 01167556 | 7/1989 |
| JP | 2004163 A | 1/1990 |
| JP | 03129255 A | 6/1991 |
| JP | 04344073 A | 11/1992 |
| JP | 07035393 A | 2/1995 |
| JP | 09196524 A | 7/1997 |
| JP | 1998097331 | 4/1998 |
| JP | 10153353 A | 6/1998 |
| JP | 10160271 | 6/1998 |
| JP | H10-153353 | 6/1998 |
| JP | 11159895 A | 6/1999 |
| JP | 11287497 A | 10/1999 |
| JP | 2000297970 A | 10/2000 |
| JP | 2001317470 A | 11/2001 |
| JP | 2002013858 A | 1/2002 |
| JP | 2002243246 A | 8/2002 |
| JP | 2003156244 | 5/2003 |
| JP | 2004135491 A | 4/2004 |
| JP | 2005-003710 A | 1/2005 |
| JP | 2005132167 A | 5/2005 |
| JP | 2005282972 A | 10/2005 |
| JP | 2006177214 A | 7/2006 |
| JP | 2006188954 | 7/2006 |
| JP | 2006233820 | 9/2006 |
| JP | 2007198230 A | 8/2007 |
| JP | 2007198705 A | 8/2007 |
| KR | 10-1996-0024115 | 7/1996 |
| KR | 2001-0044273 A | 6/2001 |
| KR | 2003-0011415 A | 2/2003 |
| KR | 2005-0059842 A | 6/2005 |
| KR | 20050085544 A | 8/2005 |
| KR | 20070071407 A | 7/2007 |
| WO | 2004059822 A1 | 7/2004 |
| WO | WO-2004083744 A1 | 9/2004 |
| WO | 2005101939 A1 | 10/2005 |
| WO | 2009048566 A3 | 5/2009 |

OTHER PUBLICATIONS

International Search Report regarding International Application No. PCT/US2008/011576 dated Mar. 23, 2009.
Written Opinion of the International Searching Authority regarding International Application No. PCT/US2008/011576 dated Mar. 20, 2009.
International Search Report regarding International Application No. PCT/US2008/011464 dated Mar. 13, 2009.
Written Opinion of the International Searching Authority regarding International Application No. PCT/US2008/011464 dated Mar. 13, 2009.
International Preliminary Report on Patentability for International Application No. PCT/US2008/011442, dated Apr. 7, 2010.
International Preliminary Report on Patentability for International Application No. PCT/US2008/011596, dated Apr. 13, 2010.
International Preliminary Report on Patentability for International Application No. PCT/US2008/011441, dated Apr. 7, 2010.
International Preliminary Report on Patentability for International Application No. PCT/US2008/011570, dated Apr. 13, 2010.
International Preliminary Report on Patentability for International Application No. PCT/US2008/011464, dated Apr. 7, 2010.
International Preliminary Report on Patentability for International Application No. PCT/US2008/011593, dated Apr. 13, 2010.
International Preliminary Report on Patentability for International Application No. PCT/US2008/011597, dated Apr. 13, 2010.
International Preliminary Report on Patentability for International Application No. PCT/US2008/011590, dated Apr. 13, 2010.
International Preliminary Report on Patentability for International Application No. PCT/US2008/011589, dated Apr. 13, 2010.
International Preliminary Report on Patentability for International Application No. PCT/US2008/011576, dated Apr. 13, 2010.
International Search Report for International Application No. PCT/US2008/011442 dated Feb. 3, 2009.

International Search Report for International Applicatoin No. PCT/US2008/011596, dated Feb. 25, 2009.
International Search Report for International Application No. PCT/US2008/011441, dated Jan. 30, 2009.
International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated Jan. 30, 2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
Non-Final Office Action regarding U.S. Appl. No. 12/246,825, dated Jan. 4, 2011.
Non-Final Office Action regarding U.S. Appl. No. 12/247,001, dated Feb. 25, 2011.
Non-Final Office Action regarding U.S. Appl. No. 12/244,387, dated Mar. 3, 2011.
Non-Final Office Action regarding U.S. Appl. No. 12/246,893, dated Apr. 1, 2011.
Notification of First Office Action from the State Intellectual Property Office of People's Republic of China regarding Chinese Patent Application No. 200880110665.0, dated Apr. 8, 2011. Translation provided by Unitalen Attorneys At Law.
Notice of Grounds for Rejection from the Korean Intellectual Property Office regarding Korean Patent Application No. 10-2010-7009374, dated May 31, 2011. Translation provided by Y.S. Change & Associates.
Final Office Action regarding U.S. Appl. No. 12/246,825, dated Jun. 14, 2011.
Office Action regarding U.S. Appl. No. 12/246,959, dated Jun. 21, 2011.
Office Action regarding U.S. Appl. No. 12/246,893, dated Aug. 1, 2011.
Final Office Action regarding U.S. Appl. No. 12/244,387, dated Aug. 17, 2011.
Final Office Action regarding U.S. Appl. No. 12/247,001, dated Sep. 1, 2011.
Office Action regarding U.S. Appl. No. 12/247,020, dated Sep. 1, 2011.
Office Action regarding U.S. Appl. No. 12/246,927, dated Sep. 6, 2011.
Notification of the Second Office Action from the State Intellectual Property Office of People's Republic of China regarding Chinese Patent Application No. 200880110665.0, dated Apr. 5, 2012. Translation provided by Unitalen Attorneys at Law.
Notification of Grounds for Refusal regarding Korean Patent Application No. 10-2010-7006707, dated May 22, 2012. Translation provided by Y.S. Chang & Associates.
Non-Final Office Action regarding U.S. Appl. No. 12/246,927, dated Jun. 6, 2012.
Final Office Action regarding U.S. Appl. No. 12/247,020, dated Jun. 6, 2012.
Non-Final Office Action regarding U.S. Appl. No. 12/246,959, dated Jun. 13, 2012.

Appeal Brief regarding U.S. Appl. No. 12/247,001, dated Feb. 1, 2012
Examiner's Answer to Appellant's Appeal Brief regarding U.S. Appl. No. 12/247,001, dated Mar. 26, 2012.
Final Office Action regarding U.S. Appl. No. 12/244,416, dated Nov. 15, 2011.
Final Office Action regarding U.S. Appl. No. 12/246,959, dated Oct. 12, 2011.
Notice of Appeal from the Examiner to the Board of Patent Appeals and Interferences and Pre-Appeal Brief Request for Review regarding U.S. Appl. No. 12/247,001, dated Dec. 1, 2011.
Notice of Final Rejection from the Korean Intellectual Property Office regarding Korean Application No. 10-2010-7009374, dated Nov. 18, 2011. Translation provided by Y.S. Chang & Associates.
Notice of Panel Decision from Pre-Appeal Brief Review regarding U.S. Appl. No. 12/247,001, dated Dec. 27, 2011.
Notification of First Office action from the State Intellectual Property Office of People's Republic of China regarding Chinese Patent Application No. 200880110484.8, dated Dec. 23, 2011. Translation provided by Unitalen Attorneys at Law.
Notification of First Office Action from the State Intellectual Property Office of People's Republic of China regarding Chinese Patent Application No. 200880110590.6, dated Feb. 29, 2012. Translation provided by Unitalen Attorneys at Law.
Notification of Grounds for Refusal regarding Korean Patent Application No. 10-2010-7007375, dated Dec. 7, 2011. Translation provided by Y.S. Chang & Associates.
Notification of Grounds for Refusal regarding Korean Patent Application No. 10-2010-7007581, dated Nov. 14, 2011. Translation provided by Y.S. Chang & Associates.
Notification of Grounds for Refusal regarding Korean Patent Application No. 10-2010-7007583 from the Korean Intellectual Property Office, dated Dec. 28, 2011. Translation provided by Y.S. Chang & Associates.
Notification of Grounds for Refusal regarding Korean Patent Application No. 10-2010-7009659, dated Feb. 8, 2012. Translation provided by Y.S. Chang & Associates.
Notification of the First Office Action from the State Intellectual Property Office of People's Republic of China regarding Chinese Patent Application No. 200880111091.9 dated Nov. 23, 2011. Translation provided by Unitalen Attorneys at Law.
Office Action regarding U.S. Appl. No. 12/246,825, dated Oct. 12, 2011.
Office Action regarding U.S. Appl. No. 12/244,387, dated Mar. 1, 2012.
Office Action regarding U.S. Appl. No. 12/244,416, dated Aug. 8, 2011.
Office Action regarding U.S. Appl. No. 12/246,893, dated Dec. 7, 2011.
"Electrical Power vs Mechanical Power," by Suvo, http://www.brighthubengineering.com/machine-design/62310-electrical-power-vs-mechanical-power/; dated Jan. 25, 2010; 2 pages.
"Solving System of Equations by Substitution," by http://cstl.syr.edu/fipse/algebra/unit5/subst.htm, dated Aug. 30, 2012; 4 pages.
Applicant-Initiated Interview Summary regarding U.S. Appl. No. 12/246,927, dated Sep. 5, 2012.
Applicant-Initiated Interview Summary regarding U.S. Appl. No. 12/247,020, dated Sep. 6, 2012.
Final Office Action regarding U.S. Appl. No. 12/244,387, dated Aug. 13, 2012.
Final Office Action regarding U.S. Appl. No. 12/246,959, dated Dec. 4, 2012.
Notice of Allowance and Fee(s) Due regarding U.S. Appl. No. 12/246,959, dated Feb. 14, 2013.
Notice of Allowance and Fees Due regarding U.S. Appl. No. 12/246,927, dated Dec. 21, 2012.
Notice of Allowance and Fees Due regarding U.S. Appl. No. 12/247,020, dated Jan. 4, 2013.
Notification of Final Rejection from Korean Intellectual Property Office regarding Korean Patent Application No. 10-2010-7006707, dated Apr. 2, 2013. Translation provided by Y.S. Chang & Associates.
Notification of First Office Action from the State Intellectual Property Office of People's Republic of China regarding Chinese Patent Application No. 200880110616.7, dated Jul. 4, 2012. Translation provided by Unitalen Attorneys at Law.
Notification of Grounds for Refusal regarding Korean Patent Application No. 10-2010-7006707, dated Oct. 23, 2012. Translation provided by Y.S. Chang & Associates.
Notification of the First Office Action from the State Intellectual Property Office of People's Republic of China regarding Chinese Application No. 2008801110726, dated Jun. 5, 2012. Translation provided by Unitalen Attorneys at Law.
Second Office Action from the State Intellectual Property Office of People's Republic of China regarding Chinese Patent Application No. 200880110616.7, dated Apr. 1, 2013. Translation provided by Unitalen Attorneys at Law.
Second Office Action from the State Intellectual Property Office of People's Republic of China regarding Chinese Patent Application No. 200880110785.0, dated Dec. 28, 2012. Translation provided by Unitalen Attorneys at Law.
Second Office Action from the State Intellectual Property Office of People's Republic of China regarding Chinese Patent Application No. 2008801110726, dated Mar. 15, 2013. Translation provided by Unitalen Attorneys at Law.
Third Chinese Office Action from the State Intellectual Property Office of People's Republic of China regarding Chinese Patent Application No. 20088011109.9, dated Feb. 18, 2013. Translation provided by Unitalen Attorneys at Law.

* cited by examiner

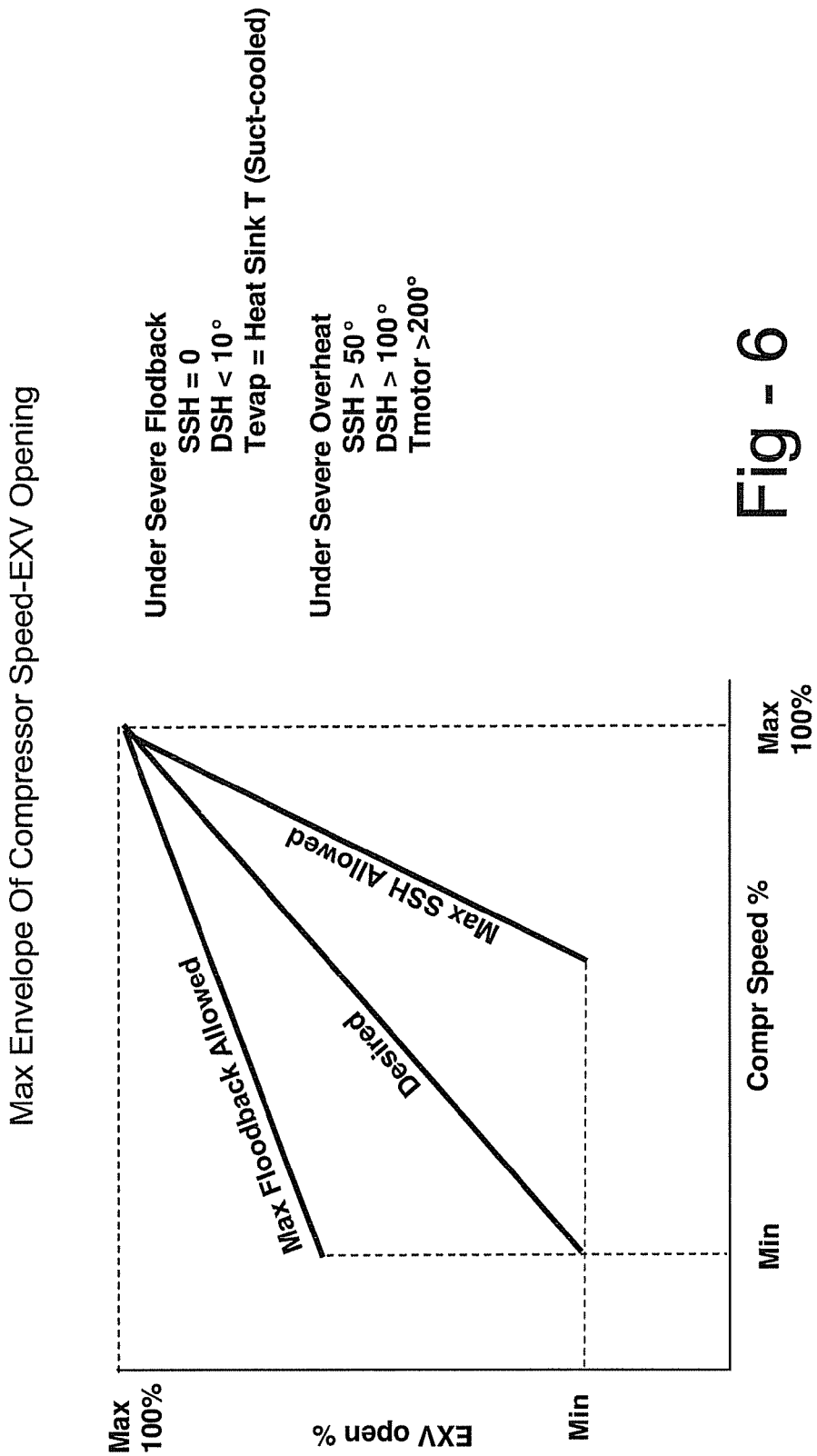

SYSTEM AND METHOD FOR MONITORING OVERHEAT OF A COMPRESSOR

CROSS-REFERENCE TO RELATED APPLICATIONS

This application claims the benefit of U.S. Provisional Application No. 60/978,312, filed on Oct. 8, 2007. This application also claims the benefit of U.S. Provisional Application No. 60/978,258, filed on Oct. 8, 2007. The entire disclosures of each of the above applications are incorporated herein by reference.

FIELD

The present disclosure relates to compressors and more particularly to a system and method for monitoring an overheat condition of a compressor.

BACKGROUND

The statements in this section merely provide background information related to the present disclosure and may not constitute prior art.

Compressors may be used in a wide variety of industrial and residential applications to circulate refrigerant within a refrigeration, heat pump, HVAC, or chiller system (generically "refrigeration systems") to provide a desired heating or cooling effect. In any of the foregoing applications, the compressor should provide consistent and efficient operation to insure that the particular application (i.e., refrigeration, heat pump, HVAC, or chiller system) functions properly. A variable speed compressor may be used to vary compressor capacity according to refrigeration system load. Operating parameters of the compressor and of the refrigeration system may be used by protection, control, and diagnostic systems to insure optimal operation of the compressor and refrigeration system components. For example, evaporator temperature and/or condenser temperature may be used to diagnose, protect, and control the compressor and other refrigeration system components.

SUMMARY

A system is provided comprising a compressor connected to an evaporator, a suction sensor that outputs a suction signal corresponding to a temperature of refrigerant entering the compressor, and a control module connected to the evaporator sensor and the suction sensor that determines an evaporator temperature, calculates a suction superheat temperature based on the evaporator temperature and the suction signal, and monitors an overheat condition of the compressor by comparing the suction superheat with a predetermined suction superheat threshold and that adjusts at least one of a speed of the compressor and an expansion valve associated with the compressor based on the monitoring.

In other features, the control module stops the compressor when the suction superheat is greater than the predetermined suction superheat threshold.

In other features, the predetermined suction superheat threshold is fifty degrees Fahrenheit.

In other features, the control module determines whether the suction superheat is within a predetermined suction superheat range, an upper limit of the predetermined suction superheat range corresponding with the predetermined suction superheat threshold.

In other features, the predetermined suction superheat range is between thirty degrees Fahrenheit and fifty degrees Fahrenheit and the predetermined suction superheat threshold is fifty degrees Fahrenheit.

In other features, the control module adjusts the speed of the compressor when the control module determines that the suction superheat is within the predetermined suction superheat range for a predetermined time period.

A method is provided comprising determining an evaporator temperature of an evaporator connected to a compressor, receiving a suction signal that corresponds to a temperature of refrigerant entering the compressor, calculating a suction superheat temperature based on the evaporator temperature and the suction signal, monitoring an overheat condition of the compressor by comparing the suction superheat with a predetermined suction superheat threshold and adjusting at least one of a speed of the compressor and an expansion valve associated with the compressor based on the monitoring.

In other features, the method includes stopping the compressor when the suction superheat is greater than the predetermined suction superheat threshold.

In other features, the predetermined suction superheat threshold is fifty degrees Fahrenheit.

In other features, the method includes determining whether the suction superheat is within a predetermined suction superheat range, an upper limit of the predetermined suction superheat range corresponding with the predetermined suction superheat threshold.

In other features, the predetermined suction superheat range is between thirty degrees Fahrenheit and fifty degrees Fahrenheit and the predetermined suction superheat threshold is fifty degrees Fahrenheit.

In other features, the method includes adjusting the speed of the compressor when the suction superheat is within the predetermined suction superheat range for a predetermined time period.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
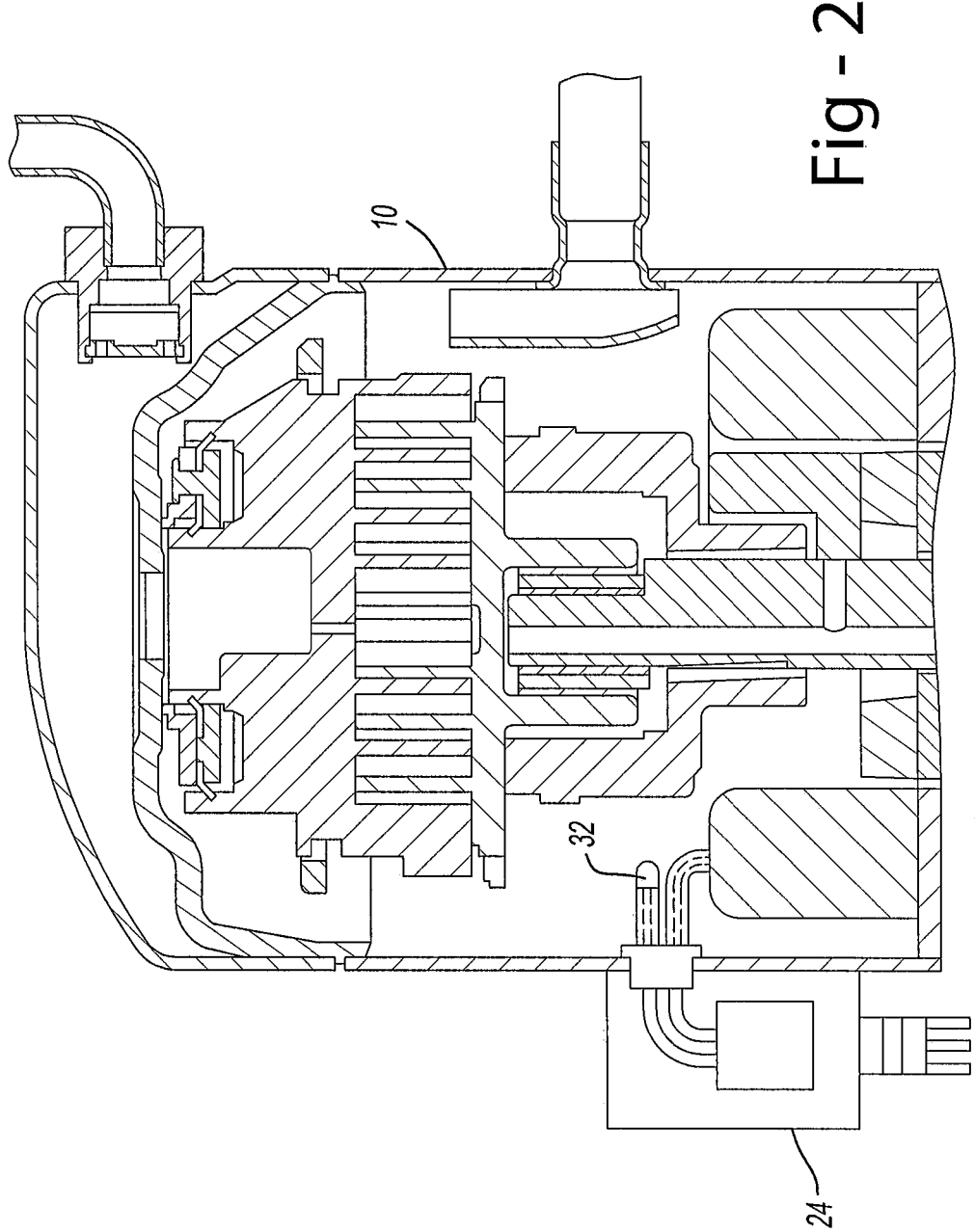
Figure 3:
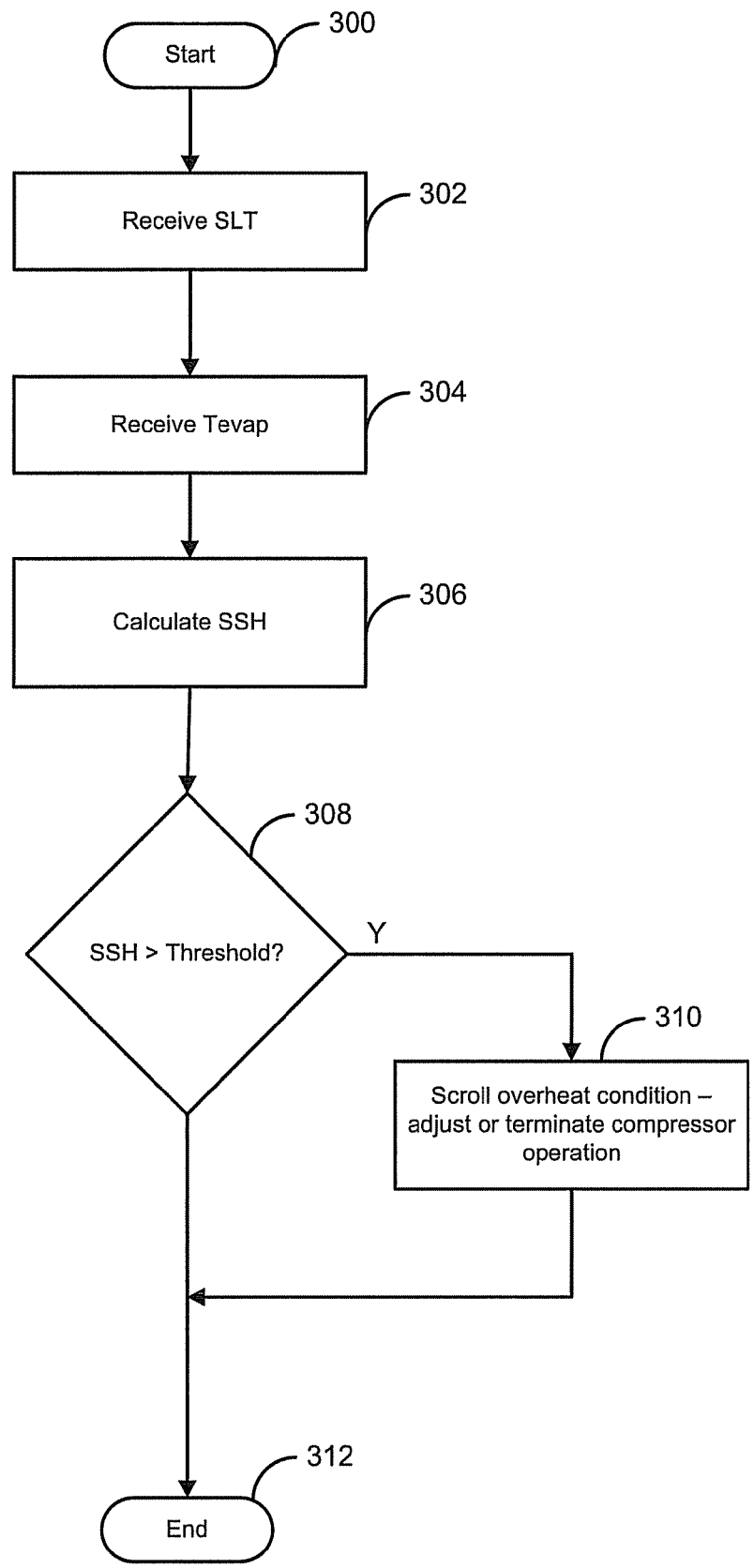
Figure 4:
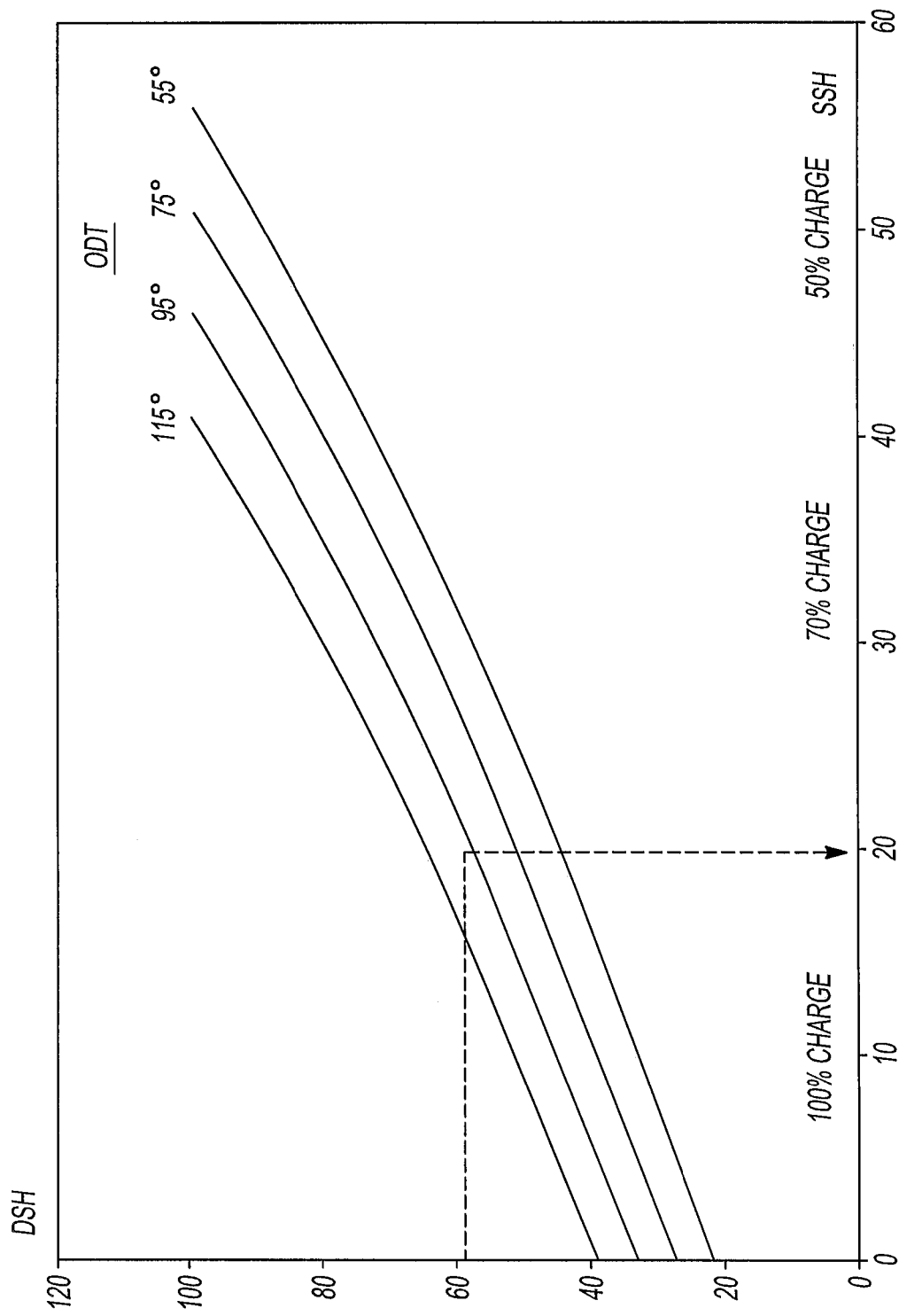
Figure 5:
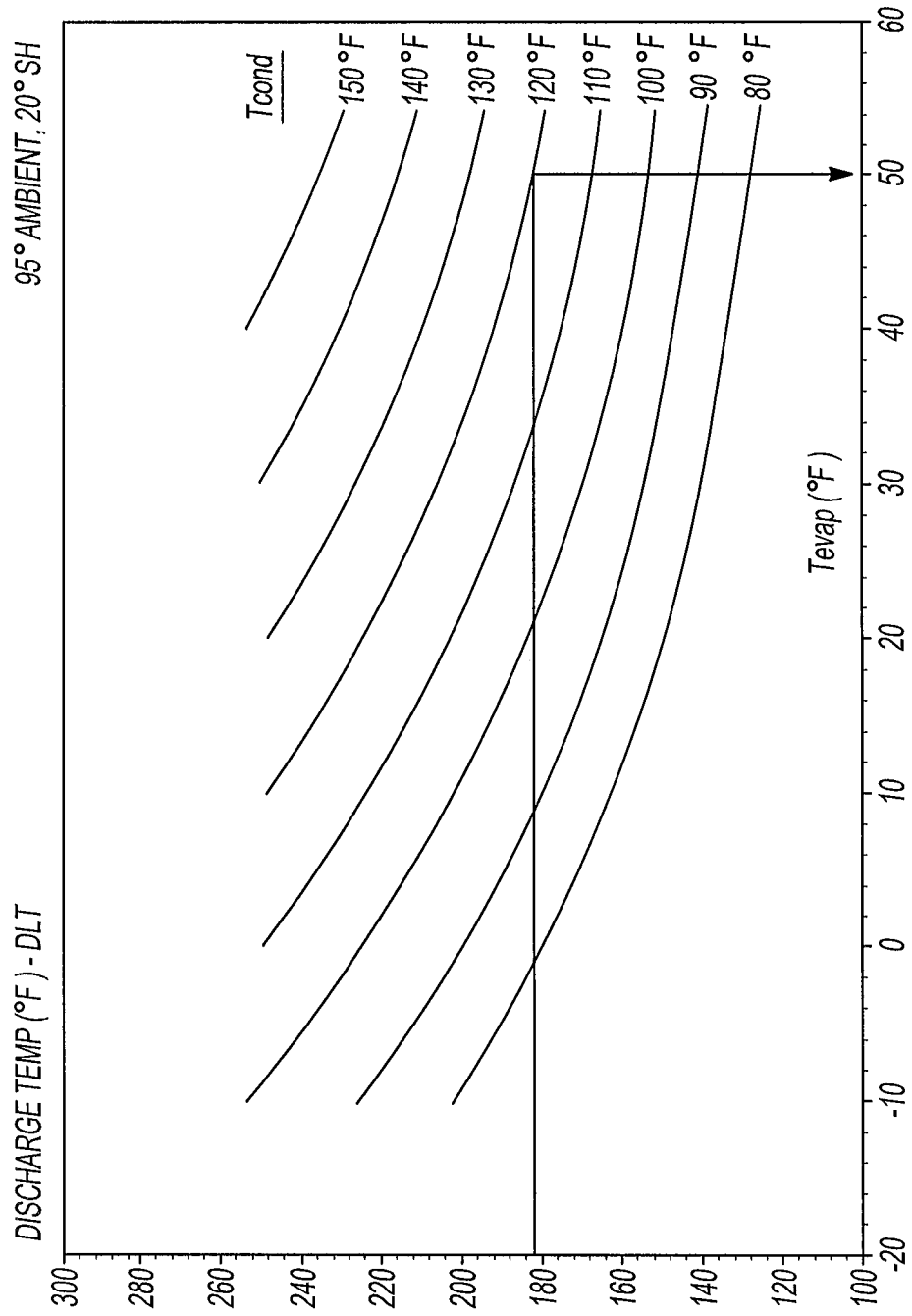

FIG. 1 is a schematic view of refrigeration system.
FIG. 2 is a cross-section view of a compressor.
FIG. 3 is a flow chart illustrating steps for an algorithm according the present teachings.
FIG. 4 is a graph showing discharge super heat correlated with suction super heat and outdoor temperature.
FIG. 5 is a graph showing discharge line temperature correlated with evaporator temperature and condenser temperature.
FIG. 6 is a graph sowing an operating envelope of a compressor.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the terms module, control module, and controller refer to one or more of the following: An application specific integrated circuit (ASIC), an electronic circuit, a processor (shared, dedicated, or group) and memory that execute one or more software or firmware programs, a combinational logic circuit, or other suitable components that provide the described functionality. As used herein, computer readable medium refers to any medium capable of storing data for a computer. Computer-readable medium includes, but is not limited to, memory, RAM, ROM, PROM, EPROM, EEPROM, flash memory, CD-ROM, floppy disk, magnetic tape, other magnetic medium, optical medium, or any other device or medium capable of storing data for a computer.

With reference to FIG. 1, an exemplary refrigeration system 5 includes a compressor 10 that compresses refrigerant vapor. While a specific refrigeration system is shown in FIG. 1, the present teachings are applicable to any refrigeration system, including heat pump, HVAC, and chiller systems. Refrigerant vapor from compressor 10 is delivered to a condenser 12 where the refrigerant vapor is liquefied at high pressure, thereby rejecting heat to the outside air. The liquid refrigerant exiting condenser 12 is delivered to an evaporator 16 through an expansion valve 14. Expansion valve 14 may be a mechanical or electronic valve for controlling super heat of the refrigerant. The refrigerant passes through expansion valve 14 where a pressure drop causes the high pressure liquid refrigerant to achieve a lower pressure combination of liquid and vapor. As hot air moves across evaporator 16, the low pressure liquid turns into gas, thereby removing heat from evaporator 16. The low pressure gas is again delivered to compressor 10 where it is compressed to a high pressure gas, and delivered to condenser 12 to start the refrigeration cycle again.

Compressor 10 may be monitored and controlled by a control module 25. Control module 25 includes a computer readable medium for storing data including the software executed by a processor to monitor and control compressor 10 and to perform the algorithms of the present teachings.

As described in the disclosure titled "VARIABLE SPEED COMPRESSOR PROTECTION SYSTEM AND METHOD", U.S. Application Ser. No. 60/978,258, which is incorporated herein by reference, suction superheat (SSH) may be used to monitor or predict an overheat condition of compressor 10. As described therein, an overheat condition is undesirable and may result in damage to compressor 10, a compressor component, or a refrigeration system component.

A compressor floodback or overheat condition is undesirable and may cause damage to compressor 10 or other refrigeration system components. Suction super heat (SSH) and/or discharge super heat (DSH) may be correlated to a flood back or overheating condition of compressor 10 and may be monitored to detect and/or predict a flood back or overheating condition of compressor 10. DSH is the difference between the temperature of refrigerant vapor leaving the compressor, referred to as discharge line temperature (DLT) and the saturated condenser temperature (Tcond). Suction super heat (SSH) is the difference between the temperature of refrigerant vapor entering the compressor, referred to as suction line temperature (SLT) and saturated evaporator temperature (Tevap).

SSH and DSH may be correlated as shown in FIG. 4. The correlation between DSH and SSH may be particularly accurate for scroll type compressors, with outside ambient temperature being only a secondary effect. As shown in FIG. 4, correlations between DSH and SSH are shown for outdoor temperatures (ODT) of one-hundred fifteen degrees Fahrenheit, ninety-five degrees Fahrenheit, seventy-five degrees Fahrenheit, and fifty-five degrees Fahrenheit. The correlation shown in FIG. 4 is an example only and specific correlations for specific compressors may vary by compressor type, model, capacity, etc.

A flood back condition may occur when SSH is approaching zero degrees or when DSH is approaching twenty to forty degrees Fahrenheit. With respect to overheating, when SSH is between thirty degrees Fahrenheit and fifty degrees Fahrenheit, the onset of an overheating condition may occur. When SSH is greater than fifty degrees Fahrenheit or when DSH is greater than one-hundred degrees Fahrenheit, a severe overheating condition may be present.

In FIG. 4, typical SSH temperatures for exemplar refrigerant charge levels are shown. For example, as the percentage of refrigerant charge in refrigeration system 5 decreases, SSH typically increases.

With reference to FIG. 1, evaporator 16 may include an evaporator temperature sensor 40 that may sense an evaporator temperature. Alternatively, an evaporator pressure sensor may be used. Control module 25 receives evaporating temperature (Tevap) from evaporator temperature sensor 40.

A suction sensor 34 monitors a temperature of refrigerant entering compressor 10 (i.e., SLT). Alternatively, a combination suction temperature/pressure sensor may be used. In such case, control module 25 may receive SLT from the temperature portion of the sensor and Tevap from the pressure portion of the sensor, as Tevap may be derived or measured based on suction pressure. Further, Tevap may be derived from other system parameters, as disclosed in the disclosure titled "VARIABLE SPEED COMPRESSOR PROTECTION SYSTEM AND METHOD", U.S. Application Ser. No. 60/978,258, which is incorporated herein by reference.

For example, Tevap may be derived as a function of Tcond and DLT, as described in commonly assigned U.S. application Ser. No. 11/059,646, U.S. Publication No. 2005/0235660. For variable speed compressors, the correlation may also reflect compressor speed. In this way, Tevap may be derived as a function of Tcond, DLT and compressor speed.

As shown in FIG. 5, Tevap is shown correlated with DLT, for various Tcond levels. For this reason, compressor map data for different speeds may be used.

Tcond and Tevap may be calculated based on a single derivation.

In addition, iterative calculations may be made based on the following equations:

$$Tcond = f(\text{compressor power, compressor speed, } Tevap) \quad \text{Equation 1}$$

$$Tevap = f(Tcond, DLT, \text{compressor speed}) \quad \text{Equation 2}$$

Multiple iterations of these equations may be performed to achieve convergence. For example, three iterations may provide optimal convergence. As discussed above, more or less iteration, or no iterations, may be used.

Tevap and Tcond may also be determined by using compressor map data, for different speeds, based on DLT and compressor power, based on the following equations:

$$Tevap = f(\text{compressor power, compressor speed, } DLT) \quad \text{Equation 3}$$

$$Tcond = f(\text{compressor power, compressor speed, } DLT) \quad \text{Equation 4}$$

Control module 25 may calculate Tevap or receive Tevap data from the pressure portion of sensor 34. Control module 25 may then calculate SSH as a difference between SLT and Tevap.

As shown in FIG. 1, suction sensor 34 is external to compressor 10 and monitors a temperature of refrigerant as it is entering the suction inlet of compressor 10. Alternatively, a suction sensor internal to the compressor may be used. As shown in FIG. 2, a suction sensor 32 may be disposed within a shell of compressor 10. In such case, SLT may be communicated to control module 25 through an electrical connection via terminal box 24.

Control module 25 may monitor an overheat condition of compressor 10 by comparing SSH with a predetermined overheat threshold. As shown in FIG. 3, control module 25 receives SLT data in step 302. In step 304, control module 25 receives Tevap from evaporator temperature sensor 40. In step 306, control module 25 calculates SSH based on SLT and Tevap. Alternatively, Tevap may be estimated or derived based on other sensed parameters, as described above and in the disclosure titled "VARIABLE SPEED COMPRESSOR PROTECTION SYSTEM AND METHOD", U.S. Application Ser. No. 60/978,258, which is incorporated herein by reference.

In step 308, control module compares SSH with a predetermined threshold to determine whether an overheat condition exists.

Control module 25 may determine that compressor 10 is operating within a normal temperature range when SSH is between zero and thirty degrees Fahrenheit. When SSH is between thirty degrees Fahrenheit and fifty degrees Fahrenheit, control module 25 may detect an overheat condition and take responsive measures. A SSH temperature above fifty degrees Fahrenheit may indicate that components of the compressor, including the compressor scrolls, bearings, etc., are at risk of being damaged.

Control module 25 may also determine whether SSH is greater than a predetermined threshold for a predetermined period of time. For example, control module 25 may determine when SSH is between thirty degrees and fifty degrees Fahrenheit, or greater than fifty degrees Fahrenheit, for a predetermined period. For example, the predetermined period may be a number of minutes (e.g., one minute, two minutes, five minutes, etc.). A first predetermined period (e.g., five minutes) may be used for monitoring when SSH is between thirty degrees and fifty degrees Fahrenheit. A second predetermined period, shorter than the first predetermined period, (e.g., one minute or two minutes) may be used for monitoring when SSH is greater than fifty degrees Fahrenheit. It is understood that any time period may be used as appropriate.

As described in the disclosure titled "VARIABLE SPEED COMPRESSOR PROTECTION SYSTEM AND METHOD", U.S. Application Ser. No. 60/978,258, which is incorporated herein by reference, in response to an overheat condition, control module 25 may adjust compressor operation and/or adjust expansion valve 14. In a severe overheat condition, control module 25 may stop operation of compressor 10. Control module 25 may also generate an alarm or notification that an overheat condition exists.

As shown in FIG. 6, a compressor operating envelope may provide maximum flood back and maximum SSH limits. In addition, a maximum scroll temperature limit (Tscroll) may be provided, in the case of a scroll compressor. In addition, a maximum motor temperature (Tmotor) may be provided. As shown in FIG. 6, compressor speed and expansion valve 14 may be adjusted based on SSH to insure compressor operation within the compressor operating envelope. In this way, SSH may be maintained within an acceptable range as indicated by FIG. 6.

For example, at a SSH between thirty degrees Fahrenheit and fifty degrees Fahrenheit, control module 25 may reduce compressor speed or cause expansion valve 14 to open. At a SSH greater than fifty degrees Fahrenheit, control module 25 may stop operation of compressor 25.

What is claimed is:

1. A system comprising:
   a compressor connected to an evaporator;
   a suction sensor that outputs a suction signal corresponding to a temperature of refrigerant entering said compressor;
   a control module connected to said suction sensor that determines an evaporator temperature, that calculates a suction superheat temperature based on said evaporator temperature and said suction signal, that monitors an overheat condition of said compressor by comparing said suction superheat temperature with a predetermined temperature range having an upper limit temperature and a lower limit temperature, and that reduces a speed of said compressor to a reduced speed and operates said compressor at said reduced speed when it is determined that said suction superheat temperature is between said upper limit temperature and said lower limit temperature, said reduced speed being determined based on said suction superheat temperature.

2. The system of claim 1 wherein said control module stops said compressor when said suction superheat is greater than said upper limit temperature of said predetermined temperature range.

3. The system of claim 1 wherein said upper limit temperature of said predetermined temperature range is fifty degrees Fahrenheit.

4. The system of claim 1 wherein said lower limit temperature of said predetermined temperature range is thirty degrees Fahrenheit and said upper limit temperature is fifty degrees Fahrenheit.

5. The system of claim 1 wherein said control module adjusts said speed of said compressor when said control module determines that said suction superheat temperature is between said upper limit temperature and said lower limit temperature for a predetermined time period.

6. The system of claim 1, further comprising an expansion valve connected to said evaporator, wherein said control module increases an opening of said expansion valve when said suction superheat temperature is between said upper limit temperature and said lower limit temperature.

7. A system comprising:
   a compressor connected to an evaporator;
   an expansion valve connected to said evaporator;
   a suction sensor that outputs a suction signal corresponding to a temperature of refrigerant entering said compressor;
   a control module connected to said suction sensor that determines an evaporator temperature, that calculates a suction superheat temperature based on said evaporator temperature and said suction signal, that monitors an overheat condition of said compressor by comparing said suction superheat temperature with a predetermined temperature range having an upper limit temperature and a lower limit temperature, and that increases an opening of said expansion valve when said suction superheat temperature is determined to be between said upper limit temperature and said lower limit temperature, said increase of said opening of said expansion valve being determined based on said suction superheat temperature.

8. The system of claim 7, wherein said control module reduces a speed of said compressor to a reduced speed and operates said compressor at said reduced speed when said suction superheat temperature is between said upper limit temperature and said lower limit temperature.

9. The system of claim 7 wherein said upper limit temperature of said predetermined temperature range is fifty degrees Fahrenheit.

10. The system of claim 7 wherein said lower limit temperature of said predetermined temperature range is thirty degrees Fahrenheit and said upper limit temperature is fifty degrees Fahrenheit.

11. A method comprising:
determining an evaporator temperature of an evaporator connected to a compressor;
receiving a suction signal that corresponds to a temperature of refrigerant entering said compressor;
calculating a suction superheat temperature based on said evaporator temperature and said suction signal;
monitoring an overheat condition of said compressor by comparing said suction superheat with a predetermined temperature range having an upper limit temperature and a lower limit temperature; and
performing, when said suction superheat temperature is determined to be within said predetermined temperature range, at least one of: reducing a speed of said compressor to a reduced speed determined based on said suction superheat temperature and operating said compressor at said reduced speed; and increasing an opening of said expansion valve, said increase being based on said suction superheat temperature.

12. The method of claim 11 further comprising stopping said compressor when said suction superheat is greater than said upper limit temperature of said predetermined temperature range.

13. The method of claim 11 wherein said upper limit temperature of said predetermined temperature range is fifty degrees Fahrenheit.

14. The method of claim 11 wherein said lower limit temperature of said predetermined temperature range is thirty degrees Fahrenheit and said upper limit temperature is fifty degrees Fahrenheit.

15. The method of claim 11 further comprising reducing said speed of said compressor when said suction superheat temperature is between said upper limit temperature and said lower limit temperature for a predetermined time period.

* * * * *

UNITED STATES PATENT AND TRADEMARK OFFICE
CERTIFICATE OF CORRECTION

PATENT NO. : 8,539,786 B2  
APPLICATION NO. : 12/247033  
DATED : September 24, 2013  
INVENTOR(S) : Daniel L. McSweeney Page 1 of 1

It is certified that error appears in the above-identified patent and that said Letters Patent is hereby corrected as shown below:

References Cited

| | |
|---|---|
| Title Page 3, Column 2, Other Publications, Line 2 | After "PCT/US2008/011576", insert --,--. |
| Title Page 3, Column 2, Other Publications, Line 4 | After "PCT/US2008/011576", insert --,--. |
| Title Page 3, Column 2, Other Publications, Line 7 | After "PCT/US2008/011464", insert --,--. |
| Title Page 3, Column 2, Other Publications, Line 9 | After "PCT/US2008/011464", insert --,--. |
| Title Page 3, Column 2, Other Publications, Lines 31-32 | After "PCT/US2008/011442", insert --,--. |
| Title Page 4, Column 1, Other Publications, Line 1 | Delete "Applicatoin" and insert --Application--. |
| Title Page 4, Column 1, Other Publications, Line 45 | Delete "Change" and insert --Chang--. |
| Title Page 4, Column 2, Other Publications, Line 2 | Delete "2012" and insert --2012.--. |
| Title Page 4, Column 2, Other Publications, Line 32 | After "10-2010-7007583", insert --,--. |
| Title Page 5, Column 1, Other Publications, Line 7 | After "Chinese", insert --Patent--. |

In the Drawings

| | |
|---|---|
| Sheen 1 of 6, Reference Numeral 12, Fig. 1 | Delete "Condensor" and insert --Condenser--. |
| Sheet 6 of 6, Fig. 6 | Delete "Flodback" and insert --Floodback--. |

In the Specification

| | |
|---|---|
| Column 2, Drawings, Line 58 | Delete "sowing" and insert --showing--. |
| Column 6, Detailed Description, Line 2 | Delete "25" and insert --10--. |

Signed and Sealed this  
Fourth Day of February, 2014

Michelle K. Lee  
*Deputy Director of the United States Patent and Trademark Office*